United States Patent [19]
Sand

[11] 4,430,706
[45] Feb. 7, 1984

[54] BRANCH PREDICTION APPARATUS AND METHOD FOR A DATA PROCESSING SYSTEM

[75] Inventor: Duane B. Sand, Saratoga, Calif.

[73] Assignee: Burroughs Corporation, Detroit, Mich.

[21] Appl. No.: 201,315

[22] Filed: Oct. 27, 1980

[51] Int. Cl.³ .............................................. G06F 9/42
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,573,854 | 4/1971 | Watson | 364/200 |
| 3,736,567 | 5/1973 | Lotan | 364/200 |
| 4,038,643 | 7/1977 | Kim | 364/200 |
| 4,155,120 | 5/1979 | Keefer | 364/200 |
| 4,179,737 | 12/1979 | Kim | 364/200 |
| 4,215,402 | 7/1980 | Mitchell | 364/200 |
| 4,245,302 | 1/1981 | Amdahl | 364/200 |
| 4,253,142 | 2/1981 | Bavoux | 364/200 |
| 4,370,711 | 1/1983 | Smith | 364/200 |
| 4,373,180 | 2/1983 | Linde | 364/200 |

OTHER PUBLICATIONS

Holgate, R. W., and Ibbett, R. N., "An Analysis of Instruction-Fetching Strategies in Pipelined Computers", *IEEE Transactions on Computers*, vol. C-29, No. 4, pp. 325-329, (Apr. 1980).

*Primary Examiner*—Raulfe B. Zache
*Attorney, Agent, or Firm*—Nathan Cass; Kevin R. Peterson; David G. Rasmussen

[57] ABSTRACT

A pipelined data processing system is provided having a branch prediction mechanism which monitors instruction flow and provides a record in a prediction memory indicating whether or not a branch instruction branched when it was last executed. When a branch instruction is encountered, the corresponding prediction indication is accessed from the prediction memory using a hash-coded version of the instruction address. This accessed prediction indication is used to permit immediate sequencing to the predicted next instruction (which is already in the pipeline) if the prediction is correct. If the prediction is incorrect, sequencing to the predicted next instruction is prevented. Instead, the correct next microinstruction is accessed and executed and the corresponding prediction indication in the prediction memory is corrected.

12 Claims, 7 Drawing Figures

FIG. 7.

| CLOCK CYCLES | C1 | C2 | C3 | C4 | C1 | C2 | C3 | C1 | C2 | C3 | C4 | C1 | C2 | C3 |
|---|---|---|---|---|---|---|---|---|---|---|---|---|---|---|
| MICROINSTRUCTION | M1 | M2 | M2 | M3 | M1 | M2 | M3 | M1 | M2 | M3 | M11 | M1 | M2 | M11 |
| SELECTED ADDRESS | A2 | A11 | A3 | A4 | A2 | A3 | A4 | A2 | A3 | A11 | A12 | A2 | A11 | A12 |
| NEXT MICROINSTRUCTION | M2 | M11 | M3 | M4 | M2 | M3 | M4 | M2 | M3 | M11 | M12 | M2 | M11 | M12 |
| BRANCH BIT B | 0 | 1 | 0 | 0 | 0 | 1 | 0 | 0 | 1 | 1 | 0 | 0 | 1 | 0 |
| APPLIED PRED. BIT P | - | 1 | - | - | - | 0 | - | - | 0 | 1 | - | - | 1 | - |
| NEXT PRED. BIT | 1 | - | 0 | 0 | 0 | - | 0 | 0 | - | - | - | 1 | - | - |
| COND. SEL. SIGNAL S | - | 0 | 1 | 0 | - | 0 | 0 | - | 1 | 1 | - | - | 1 | - |
| PRED. ERROR DET. SIGNAL I | 0 | 1 | 0 | 0 | 0 | 0 | 0 | 0 | 1 | 0 | 0 | 0 | 0 | 0 |
| PRED. F/F SIGNAL J | 0 | 0 | 0 | 0 | 0 | 0 | 0 | 0 | 0 | 1 | 0 | 0 | 0 | 0 |
| ABORT | NO | YES | NO | NO | NO | NO | NO | NO | YES | NO | NO | NO | NO | NO |

Groups: 50 (C1–C4), 51 (C1–C3), 52 (C1–C4), 53 (C1–C3)

Group 50: ABORTED CYCLE, CORRECTION CYCLE
Group 52: ABORTED CYCLE, CORRECTION CYCLE

BRANCH PREDICTION APPARATUS AND METHOD FOR A DATA PROCESSING SYSTEM

BACKGROUND OF THE INVENTION

The present invention relates to improved means and methods for controlling the sequencing and branching of instructions in a digital data processing system.

As is well known, higher performance computers often include mechanisms to increase the effective amount of concurrency or parallelism of actions in the machine. One common technique for increasing parallelism is to "pipeline" the execution of a single stream of instructions. Several consecutive instructions can be concurrently processed, so that the average time between instruction completions is less than the time to process a single instruction.

With conventional instruction sets, the possible gain from pipelining is limited by the fact that an instruction's results influence the behavior of subsequent instructions. Many instructions must be delayed until their inputs are made available by prior instructions. Also pipelining is less effective when the instruction stream is not simply a sequence of consecutive, unconditional instructions. It is then uncertain whether a particular instruction should even be executed, until all prior branch addresses and branch conditions have been fully resolved. It becomes very difficult to look ahead beyond these branch points to fine useful work for the instruction pipeline.

One approach used by some pipelined machines is to suspend the flow of new instructions until branches are fully resolved. In such a case, no mistakes are made in executing the wrong instructions, but the pipeline empties frequently and is ineffective for use with program codes having frequent branches.

Other pipelined machines employ an approach with regard to conditional branches which cause the flow to take a particular assumed branch. The assumed branch is then processed provisionally. When the correct branch condition is finally determined, the assumed direction of flow is either confirmed or refuted. If it is refuted, the provisional instructions are discarded or "undone" before switching to the correct instruction sequence. This scheme maintains high parallelism if the assumption is usually correct. When it is wrong, pipeline capacity is wasted by execution of irrelevant instructions and by the time to refill the pipeline with relevant instructions.

Another approach employed by some machines is to explore both possible paths following a two-way conditional branch. This exploration could simply involve reading the memory words containing the provisional instructions, or it could involve full execution of one or both paths. This improves the rate of execution for the correct path. However, it requires extra hardware which will only have at most 50% effective utilization, and the processing of the incorrect path slows down the correct path somewhat by contending for memory and processor resources. Furthermore, the performance gained by exploring both alternative paths is limited by the presence of additional conditional branches in these paths.

Another alternative approach employed by some computers is to somehow predict the outcome of each conditional branch, based on available information, and provisionally execute only the predicted path. Examples of the use of this prediction approach can be found in the articles: "An Analysis of Instruction-Fetching Strategies in Pipelined Computers", R. W. Holgate and R. N. Ibbett, IEEE Transactions on Computers, Vol. C-29, No. 4, pp. 325-329, April 1980, and "The S-1 Project: Developing High-Performance Digital Computers", L. C. Widdoes, Jr., COMPCON 80, Feb. 25-28, Digest of Papers, IEEE Catalog No. 80CH1491-OC, pp. 282-291. A difficulty with such prediction approaches is that they are relatively complex and require a significant amount of extra hardware.

SUMMARY OF THE PRESENT INVENTION

In accordance with the present invention, a branch prediction approach is also employed, but in a highly advantageous manner which is simple and economical as well as being effective in improving performance. In a preferred embodiment of the invention, an auxiliary implementation is added to a pipelined data processor of conventional form which monitors the instruction flow and maintains a simplified history of recent conditional branches and their outcome. When the same branch instruction is encountered again, its prior behavior is used as a prediction of the particular branch to be taken. The data processor then begins provisional execution of the instructions in the predicted branch. When a branch prediction is found to be wrong, the provisional processing of instructions on the wrongly predicted branch is aborted and the data processor is caused to take the correct branch.

The specific nature of the invention as well as other objects, features, advantages and uses thereof will become evident from the following detailed description taken in conjunction with the accompanying drawings.

BRIEF DESCRIPTION OF THE DRAWINGS

FIG. 7 is a tabular representation illustrating typical operation of the system of FIG. 1 in performing the microinstruction flow of FIG. 6.

DESCRIPTION OF A PREFERRED EMBODIMENT

Like numerals and characters represent like elements throughout the figures of the drawings.

For the purposes of this description, a preferred form of the branch prediction mechanism of the present invention will be illustrated as being incorporated in a data processing system of a type generally similar to that disclosed in the commonly assigned U.S. Pat. No. 4,155,120 issued May 15, 1979 and U.S. Pat. No. 4,179,737 issued Dec. 18, 1979, D. E. Keefer and D. R.

Kim, inventors for both patents. For illustrative purposes, it will be described how a preferred implementation of the branch prediction mechanism of the present invention can be employed for enhancing the flow of microinstructions in such a data processing system. However, it is to be understood that the present invention is also applicable to other types of data processing systems and can be employed for enhancing the flow of macroinstructions (or other higher order instructions) as well as for enhancing microinstruction flow.

Figure 1:
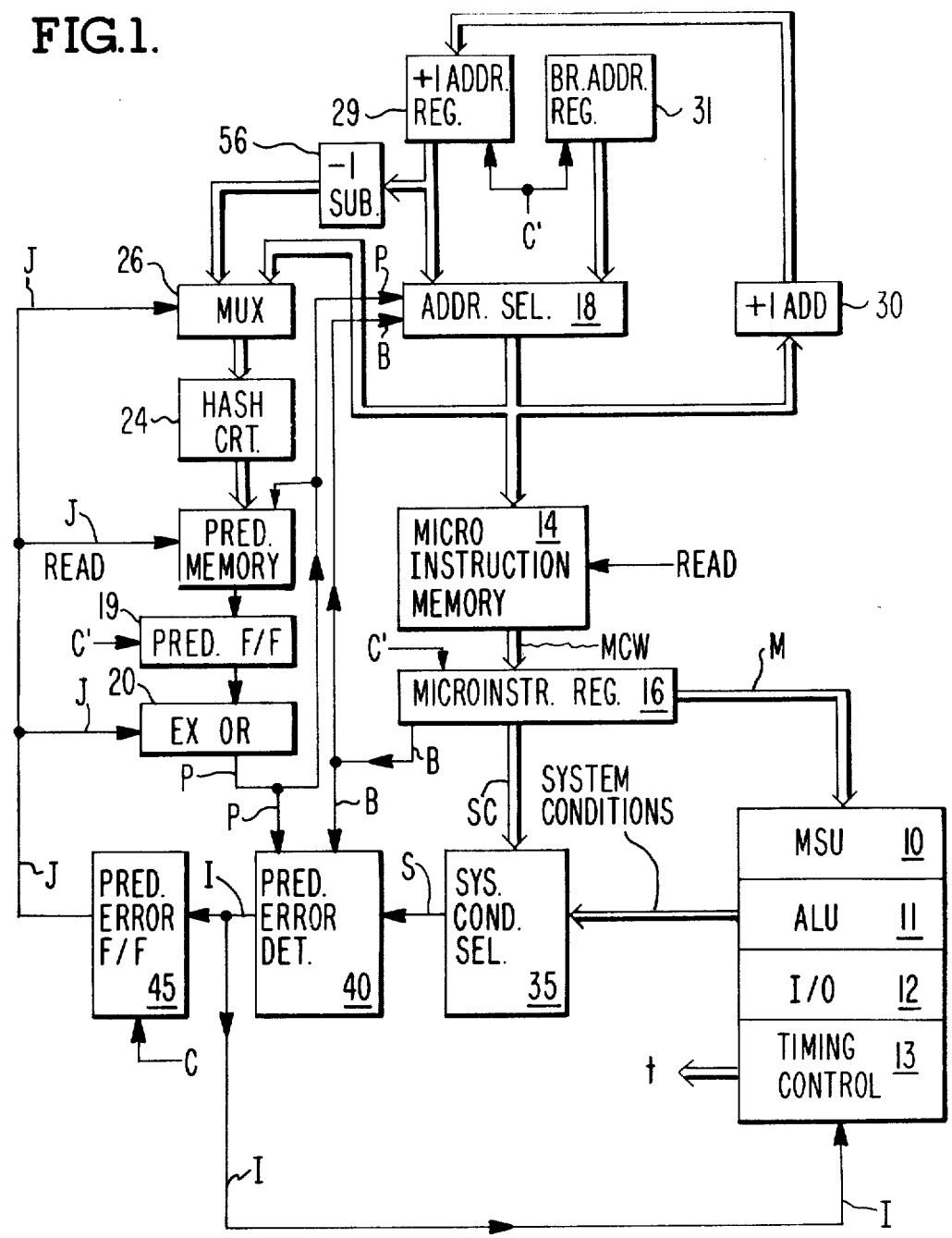
FIG. 1 is a block diagram of a digital data processing system incorporating the branch prediction approach of the present invention.

Reference is initially directed to FIG. 1 which illustrates a microprogrammed digital data processing system in which a preferred implementation of the branch prediction mechanism of the invention is incorporated. For the sake of simplicity, block 8 in FIG. 1 represents conventional portions of a digital data processing system which may be employed in conjunction with the embodiment of the microprogramming control means illustrated in the remaining portions of FIG. 1. As indicated, block 8 includes a memory storage unit (MSU) 10, an arithmetic logic unit (ALU) 11, an Input/Output Section (I/O) 12, and a timing control 13, each of which may be provided in any of a variety of well known forms presently available in the art.

A microinstruction memory 14 in FIG. 1, which is preferably a conventional programmable read-only memory (PROM), is provided to store a plurality of microinstruction control words. During each machine cycle a selected next microinstruction control word MCW is read out from microinstruction memory 14 and applied to a microinstruction register 16 in response to a Read signal and an address selected by an address selector 18. As will hereinafter be considered in more detail, the particular next microinstruction address selected by the address selector 18 is dependent upon the states of a branch bit B provided by the current microinstruction in the microinstruction register 16 and a prediction bit P provided by a prediction flip-flop 19 via an "exclusive OR" circuit 20.

Figure 2:
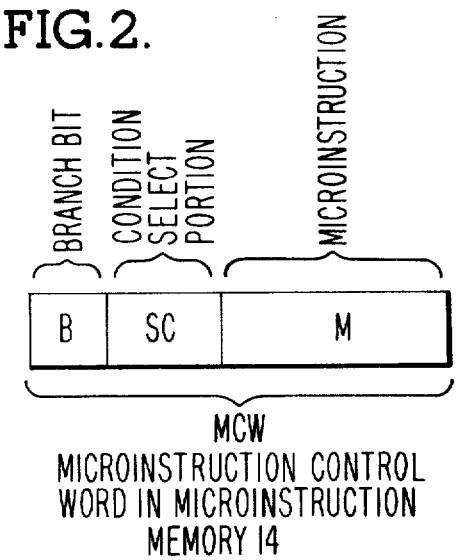
FIG. 2 illustrates the format of a typical microinstruction control word stored in the microinstruction memory 14 of FIG. 1.

FIG. 2 typically illustrates the format of a microinstruction control word MCW which is read into microinstruction register 16 from microinstruction memory 14. As shown, each control word includes a microinstruction M, a condition select portion SC and a branch bit B which is "1" when the microinstruction is capable of producing a branch, and a "0" when the microinstruction is unconditional. As is well known, microinstruction M typically comprises a plurality of bits which are applied to the elements of block 8 in FIG. 1 in order to provide for the performance of a particular micro-operation as determined by the values of the bits making up the microinstruction. A typical manner in which microinstruction execution may be performed is illustrated, for example, in U.S. Pat. No. 4,038,643. The condition select portion SC of the typical microinstruction control work illustrated in FIG. 2 contains condition select bits which are applied to a system condition selector 35 for selecting a particular system condition whose value indicates whether or not a branch is to be taken.

Before continuing with the description of FIG. 1, the timing relationships which may typically be employed in connection with the particular embodiment of the invention being disclosed herein will be briefly considered. Although timing may be provided in a variety of known ways for a microprogrammed digital data processing system, it will be assumed for illustrative purposes that timing within the system illustrated in FIG. 1 is synchronous with one microinstruction being performed during each machine cycle. It will also be assumed that all registers and flip-flops are set at the same time by a clock occurring at the end of each cycle (except where the clock is inhibited as will be considered later on herein). A typical manner in which the logic interconnecting the flip-flops and registers may be controlled in accordance with a microinstruction M read into the microinstruction register 16 in FIG. 1 is illustrated for example in FIG. 4 of the aforementioned U.S. Pat. No. 4,038,643.

It will be understood that the operating speed of the logic in the system is such that valid results of the logical operations performed during each machine cycle are applied to the inputs of the registers and flip-flops in time to be set by a clock occurring at the end of the cycle. It is also to be understood that the timing control 13 illustrated in block 8 of FIG. 1 provides appropriate timing and clocking signals "t" in a conventional manner to the microinstruction memory and the prediction memory 21 as well as to the various registers, flip-flops, logic and other circuits in the data processor to provide appropriate timing therefor.

Now considering the preferred embodiment of FIG. 1 in more detail, the address selector 18 operates in a manner such that, at the beginning of each cycle, it selects as the next microinstruction address either the next sequential microinstruction address residing in a "+1" address register 29 or a branch microinstruction address residing in a branch address register 31. The particular next microinstruction address selected by the address selector 18 during a cycle is determined by the applied prediction bit P and the branch bit B (FIG. 2) of the microinstruction control word residing in the microinstruction register 16 at the beginning of each cycle.

If the current microinstruction is unconditional, the branch bit B will be "0" and will cause the address selector 18 to unconditionally select the address in the "+1" address register 29 as the next microinstruction address, regardless of the value of the prediction bit P. This next microinstruction address in the "+1" address register 29 is the next sequential address derived from a "+1" adder 30. If, on the other hand, the previous microinstruction involves a branching situation (conditional microinstruction), then the branch bit B will be a "1". In such a case, the address selector 18 will select as the next microinstruction address either the address in the "+1" address register 29, or the address in the branch address register 31, the choice being dependent upon the value of the applied prediction bit P.

In the preferred embodiment, prediction bits are stored in a read-write memory 21 which may simply be a read-write random access memory containing, for example, 4,096 bits wherein each bit is accessed in response to a respective hash-transformed microinstruction address derived from the address selector 18 via a multiplexer 26 and a conventional hashing circuit 24. As is well known, a hashing circuit serves to transform scattered input data (such as the microinstruction addresses provided by address selector 18 in FIG. 1) into a more compact and orderly form, such as is desirable for memory addressing. For example, hashing circuit 24 may simply extract a predetermined number of the least significant bits from the full microinstruction address, or, as another example, may simply reduce pairs of bits of the full microinstruction address into single bits using an "exclusive or" function. An example of a known type of hashing circuit is disclosed in U.S. Pat. No. 4,215,402 issued July 29, 1980, G. R. Mitchell and M. E. Houdek, inventors.

In the preferred embodiment, each bit in the prediction memory 21 serves to indicate the most recent past history of a particular branch point in the microinstruction flow—that is, whether the conditional microinstruction corresponding to the prediction bit did or did not branch the last time it was executed. In the preferred embodiment, a "1" bit indicates that a branch did occur, and a "0" bit indicates that a branch did not occur. It will thus be understood that when a next microinstruction address is selected during a cycle by the address selector 18 for addressing the microinstruction memory 14, this same selected microinstruction address also addresses the prediction memory 21, via the multiplexer 26 and hashing circuit 24, to cause a corresponding prediction memory bit to be read out and applied to the prediction flip-flop 19 for use in determining the next microinstruction address to be selected by the address selector 18 during the next cycle. It will be understood that a prediction bit read out from the pediction memory 21 in response to an unconditional microinstruction address will be ignored, since the branch bit B will be "0" for an unconditional microinstruction to cause selection of the "+1" address regardless of the value of the prediction bit.

It is to be noted that, because the prediction memory 21 is addressed by a hash-transformed microinstruction address, it is likely when a highly compact hash transformation is used (which is preferred for the sake of economy and simplicity) that more than one microinstruction address will produce the same transformed result and thereby address the same bit in the prediction memory 21. It is also to be noted that a simple prediction memory as employed in the preferred embodiment is vulnerable to occasional memory errors, since there is no provision for error checking. Thus, it can be expected that the prediction provided by the preferred embodiment will occasionally appear to be forgetful, confused and/or erroneous. However, since in the preferred embodiment the prediction is used for advisory purposes, and since the advice cannot be infallible anyhow, any prediction errors caused by these failings are relatively insignificant, particularly when compared to the much more deleterious effect on performance which could be expected using a pre-assumed instruction flow because of frequent branch errors caused by loop terminations and data variations.

Having described how a prediction capability is basically provided in accordance with the invention for the embodiment of FIG. 1, this description will now proceed to describe how a prediction error is detected and the detection used to maintain correct microinstruction sequencing.

From the description so far, it will be understood that, during each cycle in the embodiment of FIG. 1, the microinstruction address selected by the address selector 18 at the beginning of each cycle will cause a corresponding next microinstruction control word (FIG. 2) to be read out of the microinstruction memory 14, and will also cause a corresponding prediction bit to be read out from the prediction memory 21. If the predicted next microinstruction is found to be correct (or if the previous microinstruction was unconditional) then, at the clock occurring at the end of the cycle, this microinstruction control word read out from the microinstruction memory 14 is stored in the microinstruction register 16 and the corresponding prediction bit read out from the prediction memory 21 is stored in the prediction flip-flop 19. Also, during this same cycle, the microinstruction portion M (FIG. 2) of a current microinstruction control word (which was read out into the microinstruction register 16 during the previous cycle) is executed by unit 8, and, if no prediction error is detected, the results of microinstruction execution are stored in appropriate storage elements of the processor at the clock occurring at the end of the cycle.

It will be understood from FIG. 1 that, while the microinstruction memory 14 and prediction memory 21 are being read and the microinstruction in the microinstruction register 16 is being executed during each cycle, the condition select portion CS (FIG. 2) of the microinstruction control word residing in the microinstruction register 16 is applied to the system condition selector 35 along with system condition signals from unit 8 (FIG. 1). The system condition selector 35 may typically be a multiplexer for which the system condition signals are the multiplexer inputs, the CS signals are the applied selection signals, and the resulting multiplexer output is one or more selected system conditions. For the embodiment of FIG. 1, the system condition selector 35 will be assumed to provide an output S having an S="1" value if the correct next microinstruction address is the branch microinstruction address in branch address register 31 in FIG. 1, and an S="0" value otherwise.

The output S of the system condition selector 35 in FIG. 1 is applied to a prediction error detector 40 along with the branch bit B (FIG. 2), and the prediction bit P. The prediction error detector 40 operates in response to these applied signals to provide an output signal I whose value indicates whether the particular next microinstruction address selected by the address register 18 during the current cycle is correct. If it is, then the prediction error detector 40 provides an I="0" output signal—if not, an I="1" output signal is provided which sets a prediction error flip-flop 45 to provide a J="1" output during the next cycle.

Figure 3:
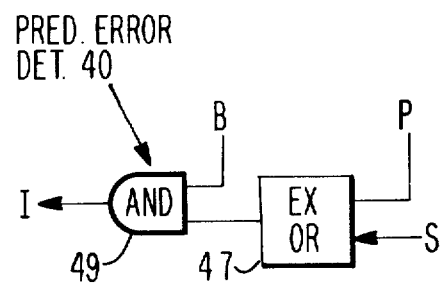
FIG. 3 is a schematic electrical diagram illustrating an implementation of the prediction error detector 40 in FIG. 1.

FIG. 3 illustrates how the prediction error detector 40 in FIG. 1 may typically be implemented. As indicated in FIG. 3, the S output from the system condition selector 35 is applied to an "exclusive or" circuit 47 along with the prediction bit P so as to produce a "1" output therefrom only if the value of the prediction bit P is different from that of the output S. It will be understood that such a difference will occur if B="1" and the predicted next microinstruction indicated by P is different from that indicated by the value of S. Of course, if the current microinstruction being executed is unconditional (i.e., B="0"), the testing for a prediction error is unnecessary since, as described previously, the address selector 18 in FIG. 1 will respond to a B="0" value of the branch bit B to select the address in the "+1" address register 29 as the next microinstruction address regardless of the value of the prediction bit P. Accordingly, the output of the "exclusive or" circuit 47 in FIG. 3 is applied to an "and" gate 49 along with the branch bit B for producing the signal I, since I at the output of gate 46 will then be "0" for an unconditional microinstruction (B="0") regardless of the output of the "exclusive or" circuit 47.

Having thus described how the I output signal is produced by the prediction error detector 40 indicating whether a correct next microinstruction prediction has been made during each cycle, it will next be described how this signal I is used along with the output signal J from the prediction flip-flop 45 to maintain correct microinstruction sequencing.

The basic purpose of an I="1" signal produced by the prediction error detector 40 when a prediction error is detected is to cause the current cycle to be aborted. This abortion in the first instance includes preventing the results of microinstruction execution produced during the current cycle from being stored in the various storage elements of the system at the end of the cycle. This is accomplished in the preferred embodiment using the clock inhibiting circuit illustrated in FIG. 4 which may be located in the timing control 13 of unit 8 in FIG. 1. The signal I from the prediction error detector 40 is accordingly shown as being applied to the timing control 13 in FIG. 1. As shown in the clock inhibiting circuit of FIG. 4, the signal I is applied to one input of an "and" gate 61 via an inverter 63, while a clock C is applied to the other input of "and" gate 61 to produce a modified clock C' at the output of "and" gate 61. FIG. 5 illustrates typical waveforms for the signals C, I and C' during three typical cycles. It will thus be understood that when I="1" during a cycle (cycle 2 in FIG. 5) clock C is prevented from passing to the output of "and" gate 61, thereby eliminating C' during that cycle. Note in FIG. 5 that the I="1" signal totally overlaps clock C so as to thereby cause the I="1" signal to completely eliminate any C' output from gate 61 in FIG. 4 during cycle 2. It is this C' output of "and" gate 61 which is applied by the timing control 13 as a clock to those storage elements in unit 8 and other parts of the system which require inhibiting in order to abort a cycle. Of course, if a data processing system already has a cycle abort mechanism, it may be used for the purposes described above by having an I="1" signal initiate its operation.

Figure 4:
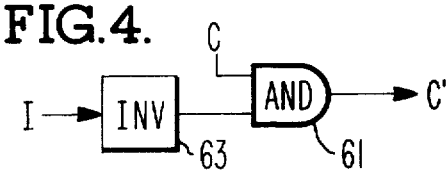
FIG. 4 is a schematic electrical diagram illustrating an implementation of a clock inhibiting circuit for use in the system of FIG. 1.
Figure 5:
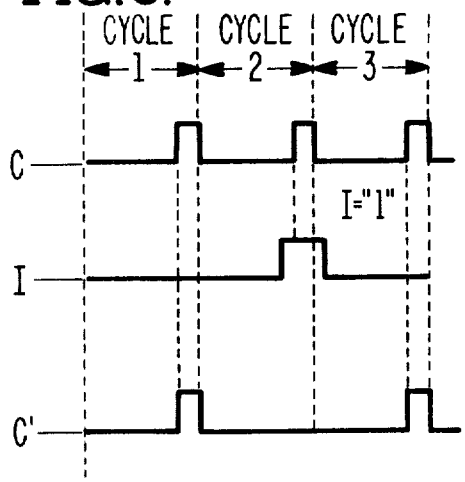
FIG. 5 is a series of graphs illustrating the operation of the circuit of FIG. 4.

As indicated in FIG. 1, the C' output of "and" gate 61 of the clock inhibiting circuit of FIG. 4 is applied as the clock for the microinstruction register 16 as well as for the "+1" address register 29, the branch address register 31, and the prediction flip-flop 19. Accordingly, when an I="1" signal is produced by the predict error detector 40 during a cycle, these registers 16, 29 and 31 and prediction flip-flop 19 will not be changed at the end of the cycle (since C' will be eliminated as illustrated in FIG. 5), the data stored therein thus being available for use during the next cycle following the aborted cycle (which will henceforth be referred to as a correction cycle). However, as also indicated in FIG. 1, the prediction error flip-flop 45 uses C as its clock rather than C' so that it will be set by the I="1" signal occurring during an aborted cycle to thereby provide a J="1" output during the correction cycle. Since the J output is applied to the "exclusive or" circuit 20 along with the output of the prediction flip-flop 19, the J=1 value provided during the correction cycle will in effect invert the prediction bit P applied to the address selector 18. Thus, when operations are repeated during the correction cycle (including repeating execution of the microinstruction M in the microinstruction register 16), the address selector 18 will now receive an inverted P value and thereby select the correct next microinstruction address. The prediction error detector 40 will thus now find that the prediction is correct and will consequently produce an I="0" output, thereby permitting the cycle to be completed without aborting. This I="0" signal will also reset the prediction error flip-flop 45, causing the J output to again become "0". Operations will then proceed to perform the correctly predicted next microinstruction in the next cycle following the correction cycle.

The remaining operation to be described in connection with the embodiment of FIG. 1 is the manner in which the prediction memory 21 is updated during a correction cycle to correct a bit which causes a prediction error to be detected. In order to provide this updating, the J="1" signal is applied to the prediction memory 21 to enable it to perform a write operation during the correction cycle. The appropriate write address at which correction is required is the particular microinstruction address which was selected by the address selector 18 in the cycle immediately preceding the aborted cycle. This microinstruction address can be derived by subtracting "1" from the address residing in the "+1" address register 29 at the start of the correction cycle. Accordingly, during a correction cycle, the J="1" signal applied to the multiplexer 26 will now cause the address in the "+1" address register 29 to be applied via a "−1" subtractor circuit 56 to the hash circuit 24 (instead of the address from address selector 18 which occurs when J="0") for providing a write address to the prediction memory 21 during the correction cycle. As indicated in FIG. 1, the corrected prediction bit to be written into this address in the prediction memory 21 during the correction cycle is obtained from the "exclusive or" circuit 20 which, as described previously, inverts the incorrect prediction bit to provide a correct prediction bit during the correction cycle.

The manner in which the embodiment of FIG. 1 typically provides for improved microinstruction sequencing in accordance with the invention will now be illustrated with reference to the specific example of microinstruction sequencing illustrated in FIGS. 6 and 7.

Figure 6:
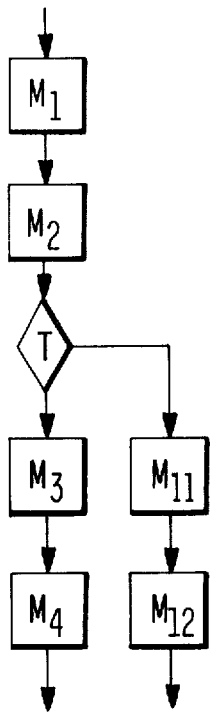
FIG. 6 is a fragmentary microinstruction flow which is used as an example to illustrate the operation of the system of FIG. 1.

FIG. 6 illustrates a fragmentary portion of a microinstruction flow which may be performed by the embodiment of FIG. 1. Each square block in FIG. 6 represents the execution of a microinstruction indicated by the block label. The T block indicates a branch point in the microinstruction flow at which a branch decision has to be made. Thus, as indicated in FIG. 6, a decision has to be made as to whether the microinstruction which is to follow $M_2$ is to be the next sequential microinstruction $M_3$ or is to be the microinstruction $M_{11}$.

FIG. 7 illustrates how operations may typically sequence through the fragmentary microinstruction flow illustrated in FIG. 6. More specifically, it is initially assumed in FIG. 7 that processing is such that the desired path through the fragmentary microinstruction flow of FIG. 5 is without taking the branch indicated— that is, it is desired that microinstructions $M_1$, $M_2$, $M_3$, $M_4$ be performed in that order. It is also assumed that the prediction bit initially stored in the prediction memory 21 at the memory location corrresponding to the address of branch microinstruction $M_2$ is a "1" indicating a predicted flow from $M_2$ to $M_{11}$ contrary to the assumed desired initial flow of $M_1$, $M_2$, $M_3$, $M_4$. It is further assumed that the immediately preceding cycle was not aborted so that signal J is initially "0".

The groups 50, 51, 52 and 53 of clock cycles shown in the top row of FIG. 7 illustrate different possible flows through the fragmentary microinstruction flow of FIG. 6 for the conditions assumed above. The "Microinstruction" row in FIG. 7 indicates the particular microinstruction contained in microinstruction register 16 wich is executed during each clock cycle. The "Selected Address" row in FIG. 7 indicates the next microinstruction address selected by the address selector 18 during each cycle (designated by "A" with an appropriate subscript). The "next Microinstruction" row in FIG. 6 identifies the next microinstruction read out of the microinstruction memory 14 during the cycle (in response to the address selected by the address selector 18) for execution during the next cycle. The "Branch Bit" row in FIG. 7 indicates the state of the branch bit B contained in the microinstruction control word in microinstruction register 16 and applied to the address selector 18 during the cycle. The "Applied Pred. Bit" row indicates the value of the prediction bit P applied to the address selector 18 (FIG. 1) during each clock cycle. The "Next Prediction Bit" row in FIG. 7 indicates the prediction bit read out of the prediction memory 21 during each cycle (in response to the address selected by the address selector 18) for use during the next cycle. The next three rows in FIG. 6, designated "Sys. Cond. Sel. Signal S", "Prediction Error Detector Signal I" and "Prediction Error Flip-Flop Signal J" indicate the respective values of these signals during each clock cycle. The last row in FIG. 6 designated "Abort" indicates by "Yes" or "No" whether the corresponding clock cycle was aborted.

The first group 50 of clock cycles $C_1$, $C_2$, $C_3$, $C_4$ in FIG. 7 illustrates the first pass through the fragmentary microinstruction flow illustrated in FIG. 6. As indicated, during clock cycle $C_1$ of group 50 in FIG. 6, microinstruction $M_1$ (which is contained in microinstruction register 16 in FIG. 1) is executed and the flow then proceeds to the next sequential microinstruction $M_2$ during the next cycle $C_2$, since the branch bit B accompanying microinstruction $M_1$ is a "0" indicating that sequencing from $M_1$ to $M_2$ is unconditional. The prediction error detector 40 thus produces an I="0" output during $C_1$ of group 50. As assumed, the next prediction bit read out during $C_1$ is a "1" which incorrectly indicates a branch from $M_2$ to $M_{11}$. A dash "(−)" is shown for the applied prediction bit P and the condition selector signal S during $C_1$, since their value is of no significance for an unconditional microinstruction. Also, no abort occurs during $C_1$ of group 50 as indicated by the "No" in the $C_1$ column.

During the next clock cycle $C_2$ of group 50 in FIG. 7, execution will begin of microinstruction $M_2$ which will have been stored in the microinstruction register 16 in FIG. 1 at the end of $C_1$. Because $M_2$ is capable of sequencing to either $M_3$ or $M_{11}$ as illustrated in FIG. 5, the accompanying branch bit B of $M_2$ will be a "1" as indicated for $C_2$ of group 50 in FIG. 7. As also indicated in FIG. 7, the prediction bit P (accessed from the prediction memory 21 during $C_1$) applied to the address selector 18 during $C_2$ is a "1" which, as assumed, wrongly predicts that $M_{11}$ is the next microinstruction instead of the desired $M_3$. Thus, as indicated in FIG. 7, during $C_2$ of group 50 in FIG. 7, the prediction error detector 40 in FIG. 1 produces an I="1" output, since P="1" while the system condition selector signal S is "0", thereby causing an abort of microinstruction $M_2$, as indicated by the "Yes" for $C_2$ of group 50 in the "Abort" row of FIG. 7.

Since clock cycle $C_2$ of group 50 is aborted, cycle $C_3$ will be a correction cycle during which signal J will be a "1", which causes the "exclusive or" circuit 20 in FIG. 1 to invert the prediction bit P applied to the address selector 18 from "1" to "0" so as to now correctly predict $M_3$ as the next microinstruction. The prediction error detector 40 will thus now produce an I="0" signal, since both P="0" and S="0" during $C_3$. Also, during $C_3$ of group 50, the J="1" signal will cause this inverted prediction bit P="0" to be written into the prediction memory 21 at a location corresponding to the hashed address of $M_2$, thereby recording the fact that $M_2$ sequenced to $M_3$ during this latest pass through the fragmentary flow illustrated in FIG. 6.

The last clock cycle $C_4$ of group 50 in FIG. 7 illustrates the execution of microinstruction $M_3$ which is stored in the microinstruction register 16 in FIG. 1 at the end of $C_3$. Since, as illustrated in FIG. 6, $M_3$ unconditionally sequences to $M_4$, the branch bit during $C_4$ of group 50 is "0" and an I="0" signal will result. Also, signal J will have been returned to "0" at the end of $C_2$ and will thus be "0" during $C_4$ and there will be no abort.

It is typical in the performance of many types of data processing operations involving one or more branches that a particular microinstruction flow path, such as $M_1$, $M_2$, $M_3$ in the fragmentary microinstruction flow of FIG. 6, will be required to be followed many times before a branch, such as from $M_2$ to $M_{11}$, is required, and that this branch will in turn typically be followed many times before the microinstruction flow returns to the original sequence $M_1$, $M_2$, $M_3$. Thus, with regard to the operational example illustrated in FIG. 7, it will be understood that the sequence $M_1$, $M_2$, $M_3$ performed during clock cycles $C_1$, $C_2$, $C_3$, $C_4$ of group 50 may be expected to be performed many times before a branch will be required from $M_2$ to $M_{11}$. Thus, although the four clock cycles $C_1$, $C_2$, $C_3$, $C_4$ of group 50 are initially required to perform the microinstruction sequence $M_1$, $M_2$, $M_3$, $M_4$ because the branch prediction provided during $C_2$ was incorrect, the updating of the corresponding prediction bit in the prediction memory 21 during the correction cycle $C_3$ will make it possible to perform next occurring $M_1$, $M_2$, $M_3$ sequences (assuming no intervening branch) in just three clock cycles, as illustrated by cycles $C_1$, $C_2$, $C_3$ of group 51 in FIG. 7. A considerable savings in processing time is thereby realized, since these next occurring $M_1$, $M_2$, $M_3$ sequences are performed without having to wait for any system condition testing just as if no branch possibility existed.

Eventually, the path through the microinstruction flow of FIG. 6 will change so that a branch from $M_2$ to $M_{11}$ will be required instead of from $M_2$ to $M_3$. Clock cycles $C_1$, $C_2$, $C_3$, $C_4$ of group 52 in FIG. 7 illustrates the initial pass through the flow structure of FIG. 6 when a branch from $M_2$ to $M_{11}$ is first required. The operations occurring during these clock cycles of group 52 will readily be understood from the previous consideration of the clock cycles of group 50. The main difference is that the flow is caused to branch from $M_2$ to $M_{11}$ and, in accordance therewith, the prediction bit in the prediction memory 21 at the location corresponding to the hashed address of $M_2$ is updated from "0" to "1" during the correction cycle $C_3$ of group 52 to thereby correctly predict the branch from $M_2$ to $M_{11}$. Thus, each subsequent pass through the microinstruction flow of FIG. 6 for which a branch from $M_2$ to $M_{11}$ is required (assuming no intervening change in the flow) will then be correctly predicted and will thus require only the three clock pulses $C_1$, $C_2$, $C_3$ shown for group 53 in FIG. 6 which illustrates the operation for each of these subsequent passes requiring a branch from $M_2$ to $M_{11}$. Accordingly, a considerable savings in processing time is again achieved even though a different flow is required through the microinstruction flow of FIG. 6, since, after the initial updating of the pertinent prediction bit for the changed flow, there is then no need to wait for any system condition testing during the subsequent flows.

As considered earlier herein, the hashing circuit 24 in FIG. 1 provides for the translation of microinstruction addresses selected by the address selector 18 into more compact form for addressing the prediction memory 21. For the sake of economy in the preferred embodiment, the prediction memory 21 provides for storage of significantly fewer prediction bits than the total number of microinstruction addresses available. As also mentioned previously, this introduces the possibility that different microinstruction addresses will, after hashing, access the same prediction memory location and thus the same prediction bit. This means that a microinstruction address may read out a prediction bit which was updated by a different microinstruction address. The example of FIG. 7 assumes that such a situation did not occur. This is a reasonable expectation since the nature of data processing operations is typically such that most recently used microinstructions are more likely to be used again in an ongoing processing operation than those less recently used. However, even if the wrong prediction bit is occasionally read out, it will not significantly increase processing time for most typical types of data processing operations, since the prediction bit read out for a different microinstruction address than intended will in any event be right fifty percent of the time. Furthermore, the selection of microinstruction addresses, the hashing function and/or the size of the prediction memory 21 can be chosen to minimize deleterious effects caused by different microinstruction addresses addressing the same prediction bit.

Another point to note is that, because a J = "1" condition causes a write operation to be performed on the prediction memory 21 during a correction cycle (instead of the usual read operation) in order to update an erroneous prediction bit, the next prediction bit will not be read out from the prediction memory 21 during a correction cycle. Thus, in the next cycle following a correction cycle the prediction bit applied to the address selector will be the same as applied during the aborted cycle. For example, in FIG. 7, note that the applied prediction bit during cycle C4 of groups 50 and 52 is the same as during the aborted cycle C2. However, this will normally have an insignificant affect on processing time. One reason is that an unconditional microinstruction (for which B = "0") usually follows a branch microinstruction (such as in FIG. 6), in which case the value of the prediction bit is immaterial anyhow. Even if a branch microinstruction were to follow a previous branch microinstruction for which a correction cycle was required, the prediction bit would in any event have a fifty percent chance of being correct. But even if the prediction were wrong, it would merely cause another correction cycle to occur which would update the prediction bit accordingly. Then during the next pass, both of these branch microinstructions will have updated prediction bits and there will be no need for any correction cycle, assuming, of course, that the desired flow path is the same. If, however, it were desired to provide a prediction bit for a branch instruction following a correction cycle, this could readily be accomplished by employing a prediction memory which is capable of performing both a read and write operation during each cycle.

Although the description provided herein has been primarily directed to a particular illustrative embodiment, it is to be understood that many modifications and variations in construction, arrangement, use and operation are possible without departing from the true scope of the present invention. For example, the invention can readily be applied to a microinstruction flow having a multiple point by employing additional prediction bits at each location of the prediction memory.

The appended claims are accordingly intended to embrace all possible modifications and variations of the present invention encompassed thereby.

What is claimed is:

1. In a data processing system for performing data processing operations using an instruction flow containing at least one branch instruction, the combination comprising:

instruction storing means;

instruction executing means;

instruction accessing means for accessing an instruction from said instruction storing means for execution by said executing means;

prediction means coupled to said accessing means for providing a corresponding predicted next instruction indication for each branch instruction accessed from said storing means by said accessing means;

said accessing means being operative concurrently with the execution of a branch instruction by said executing means to access a predicted next instruction from said storing means based on the value of the predicted next instruction indication provided by said prediction means for the executing branch instruction;

sequencing control means for determining whether the predicted next instruction is correct based on the predicted next instruction indication provided for the executing branch instruction and at least one system condition provided during instruction execution;

said sequencing control means being operative in response to a determination that the predicted next instruction is correct for permitting the predicted next instruction to be executed by said executing means;

said sequencing control means being operative in response to a determination that the predicted next instruction is not correct for preventing execution of the predicted next instruction and instead causing said accessing means to access the correct next instruction for execution by said executing means; and updating means responsive to a determination by said sequencing control means that a predicted next instruction is incorrect for automatically updating the corresponding predicted next instruction indication which will be provided by said prediction means when the corresponding branch instruction is next accessed by said accessing means.

2. The invention in accordance with claim 1, wherein said prediction means includes selectively addressable prediction storage means for storing predicted next instruction indications, and wherein said prediction means operates to read out a predicted next instruction indication from said prediction storage means in response to an address provided by said instruction accessing means.

3. The invention in accordance with claim 2, wherein said prediction means includes hashing means to which said address is applied for conversion into a hashed address before being applied to said prediction storage means.

4. The invention in accordance with claims 1, wherein said instruction accessing means provides branch instruction addresses to said instruction storage means for accessing instructions therefrom, wherein said prediction means includes selectively addressable prediction storage means for storing predicted next instruction indications, and wherein said prediction storage means is responsive to a branch instruction address to read out a corresponding predicted next instruction indication.

5. The invention in accordance with claim 4, wherein said accessing means sequentially provides instruction addresses to said instruction storing means and said prediction storage means.

6. The invention in accordance with claim 5, wherein said prediction means includes hashing means to which a branch instruction address is applied for conversion into a hashed address before being applied to said prediction storage means.

7. The invention in accordance with claim 2, 3, 4, 5 or 6, wherein said updating means includes means for causing an updated predicted next instruction indication to be written into said prediction storage means at an address corresponding to the branch instruction for which the next instruction indication was determined to be incorrect.

8. The invention in accordance with claim 7, wherein the predicted next instruction indication for a branch instruction comprises a single bit whose value indicates whether or not the branch instruction produced a branch the last time it was executed.

9. The invention in accordance with claim 1, 2, 3, 4, 5 or 6, wherein the predicted next instruction indication for a branch instruction comprises a single bit whose value indicates whether or not the branch instruction produced a branch the last time it was executed.

10. The invention in accordance with claim 1, 2, 3, 4, 5 or 6, wherein said system operates cyclically, and wherein said executing means, said accessing means, said prediction means, said sequencing control means and said updating means are capable of performing their respective operations during a cycle of said system.

11. In a data processing system for performing data processing operations using an instruction flow containing at least one branch instruction, the method comprising the steps of:

accessing a branch instruction from an instruction storage means in response to a branch instruction address and providing a corresponding predicted next instruction indication from a prediction storage means in response to the branch instruction address;

executing the accessed branch instruction while currently accessing one of a plurality of possible next instructions based on the value of said predicted next instruction indication and providing during execution of the accessed branch instruction at least one system condition whose value is indicative of the correct next instruction;

determining in response to said corresponding predicted next instruction indication and said at least one system condition whether said predicted next instruction is correct; and executing said predicted next instruction if it is determined to be correct, preventing execution of said predicted next instruction if it is determined to be incorrect and instead causing the correct next instruction to be accessed and executed, and automatically updating a predicted next instruction indication in said prediction storing means in response to determining that it produced an incorrect prediction of the next instruction.

12. The invention in accordance with claim 11, wherein the providing of a corresponding predicted next instruction indication includes hash-transforming said branch instruction address and employing the result as an address for accessing said prediction storage means.

* * * * *

UNITED STATES PATENT AND TRADEMARK OFFICE
CERTIFICATE OF CORRECTION

PATENT NO. : 4,430,706
DATED : February 7, 1984
INVENTOR(S) : Duane B. Sand

It is certified that error appears in the above-identified patent and that said Letters Patent is hereby corrected as shown below:

Col. 3, line 56, change "work" to --word--.
Col. 5, line 64, after "microinstruction" insert --address--.
Col. 12, line 8, after "multiple" insert --branch--.
Col. 13, line 4, change "claims" to --claim--.

Signed and Sealed this

First Day of May 1984

[SEAL]

Attest:

Attesting Officer

GERALD J. MOSSINGHOFF

Commissioner of Patents and Trademarks